(12) United States Patent
Priem (10) Patent No.: US 7,109,996 B1  
(45) Date of Patent: Sep. 19, 2006

(54) APPARATUS AND METHOD FOR RENDERING CHARACTERS INTO A MEMORY

(75) Inventor: Curtis R. Priem, Fremont, CA (US)

(73) Assignee: nVidia Corporation, Santa Clara, CA (US)

( * ) Notice: Subject to any disclaimer, the term of this patent is extended or adjusted under 35 U.S.C. 154(b) by 0 days.

(21) Appl. No.: 10/072,043

(22) Filed: Feb. 6, 2002

Related U.S. Application Data (63) Continuation of application No. 09/274,200, filed on Mar. 22, 1999, now Pat. No. 6,421,059.

(51) Int. Cl.  
*G09G 5/22* (2006.01)

(52) U.S. Cl. .................... 345/551; 345/467

(58) Field of Classification Search ............. 345/467, 345/551  
See application file for complete search history.

(56) References Cited

U.S. PATENT DOCUMENTS

| | | | | |
|---|---|---|---|---|
| 5,159,665 A | | 10/1992 | Priem et al. ............. 395/134 |
| 5,280,577 A | * | 1/1994 | Trevett et al. ............ 345/469 |
| 5,734,873 A | * | 3/1998 | Lobodzinski et al. ...... 345/548 |
| 5,771,371 A | * | 6/1998 | Morse et al. ............. 345/501 |
| 5,793,386 A | * | 8/1998 | Larson et al. ............ 345/553 |
| 5,870,084 A | * | 2/1999 | Kanungo et al. .......... 345/501 |
| 5,914,726 A | | 6/1999 | Schultz .................. 345/501 |
| 5,999,199 A | * | 12/1999 | Larson .................. 345/531 |
| 6,236,390 B1 | * | 5/2001 | Hitchcock ............... 345/694 |
| 6,421,059 B1 | * | 7/2002 | Priem ................... 345/551 |

\* cited by examiner

*Primary Examiner*—Kee M. Tung  
*Assistant Examiner*—Jin Cheng Wang (57) ABSTRACT

A system and method for rendering fonts into a memory is disclosed. The system and method comprises a data structure located within the memory. The data structure includes at least one font array. The method and system includes a graphics controller for accessing at least one font array in the memory and for rendering characters of at least one font array into the appropriate locations in the memory to be scanned onto a monitor. Accordingly, a system and method in accordance with the present invention provides for a plurality of font arrays to be provided within a memory of a computer system. The memory could be the frame buffer, system memory or any other memory within the computer system. The graphics controller includes a mechanism which allows for a font array to be accessed by the graphics controller. The graphics controller also includes a mechanism for allowing each font character to be rendered into the memory. In so doing, the number of transfers from the CPU is significantly reduced.

31 Claims, 5 Drawing Sheets

APPARATUS AND METHOD FOR RENDERING CHARACTERS INTO A MEMORY

RELATED U.S. APPLICATION

This application is a Continuation 09/274,200 of the copending patent application, filed Mar. 22, 1999, U.S. Pat. No. 6,421,059, with issue date Jul. 16, 2002, assigned to the assignee of the present application and hereby incorporated by reference.

FIELD OF THE INVENTION

The present invention relates to generally to a computer system and more particularly to rendering font characters into memory in a computer system in an efficient manner.

BACKGROUND OF THE INVENTION

The constant emphasis in the design of computer systems has been on making such systems faster and able to handle larger amounts of information so that they may accomplish more work. The ability of computers to do more work is also enhanced by their ability to do more different kinds of work. For example, computers have become of much more use in many more activities with the advent of computer graphics displays which allow the presentation of not only numbers and text materials but pictures and graphs representing the meanings of those numbers and adding tot he meaning of the text material. It has gradually become the belief of a great number of people in the computer industry that a graphical output should be presented on almost all computer systems.

In a typical computer system, a graphics controller sends video signals to monitors and also controls a frame buffer memory system. Fonts representing text, for example, are written into a frame buffer associated with the computer system. The graphics controller typically extracts the characters of the font to scan them onto a display or monitor of the computer system. A first system for rendering font characters into the frame buffer on system memory requires that the font characters be downloaded directly from a central processing unit (CPU) via the graphics controller. Downloading the characters directly from the CPU can be a very slow process because an image of a character typically requires many bytes per pixel.

In a second embodiment, a glyph is provided. A glyph is a compressed representation of the font for each byte of a font. Typically, in a glyph a bit represents a pixel of information. Accordingly, each pixel represented on the frame buffer is represented by one bit of information provided by the CPU, rather than a byte or bytes of information being rendered in to the memory as required in the first above-mentioned system. Accordingly, it is possible in accordance with the second embodiment to provide for lossless compression and therefore a faster render rate is possible.

In such a system, the graphics controller will select between two color registers, typically referred to as a foreground register and a background register. The graphics controller receives the bits from the CPU representative of the particular character of a particular font and based upon the whether a bit represents foreground or background color, the appropriate register renders the byte or bytes of information for that pixel. The lossless compression is possible because font characters are typically one color (for example, black) and therefore only two different colors need to be provided (i.e., black for foreground and white for background). Although the second embodiment has some advantages over the first above described embodiment, it still has some significant disadvantages which will be described below.

A system in accordance with the second embodiment, requires that the CPU transfer several pieces of information to graphics controller for every font character that is to be rendered into memory. Accordingly, the CPU must find the fonts, find the character in the font, and then figure out how many bytes to transfer and transfer this information across the bus. In so doing, several different transfers are required to render a group of font characters into memory. Therefore, the bandwidth required for the transfers becomes a significant issue.

Accordingly, what is needed is a system that allows for increased throughput of fonts in a computer system to allow more efficient rendering of font characters thereof. The system must be efficient, easily implemented and a cost effective alternative to existing systems.

The present invention addresses such a need.

SUMMARY OF THE INVENTION

A system and method for rendering fonts into a memory is disclosed. The system and method comprises a data structure located within the memory. The data structure includes at least one font array. The method and system includes a graphics controller for accessing at least one font array in the memory and for rendering characters of at least one font array into the appropriate locations in the memory to be scanned onto a monitor.

Accordingly, a system and method in accordance with the present invention provides for a plurality of font arrays to be provided within a memory of a computer system. The memory could be the frame buffer, system memory or any other memory within the computer system. The graphics controller includes a mechanism which allows for a font array to be accessed by the graphics controller. The graphics controller also includes a mechanism for allowing each font character to be rendered into the memory. In so doing, the number of transfers from the CPU is significantly reduced.

DETAILED DESCRIPTION

The present invention relates to generally to a computer system and more particularly to rendering font characters into memory in a computer system in an efficient manner. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
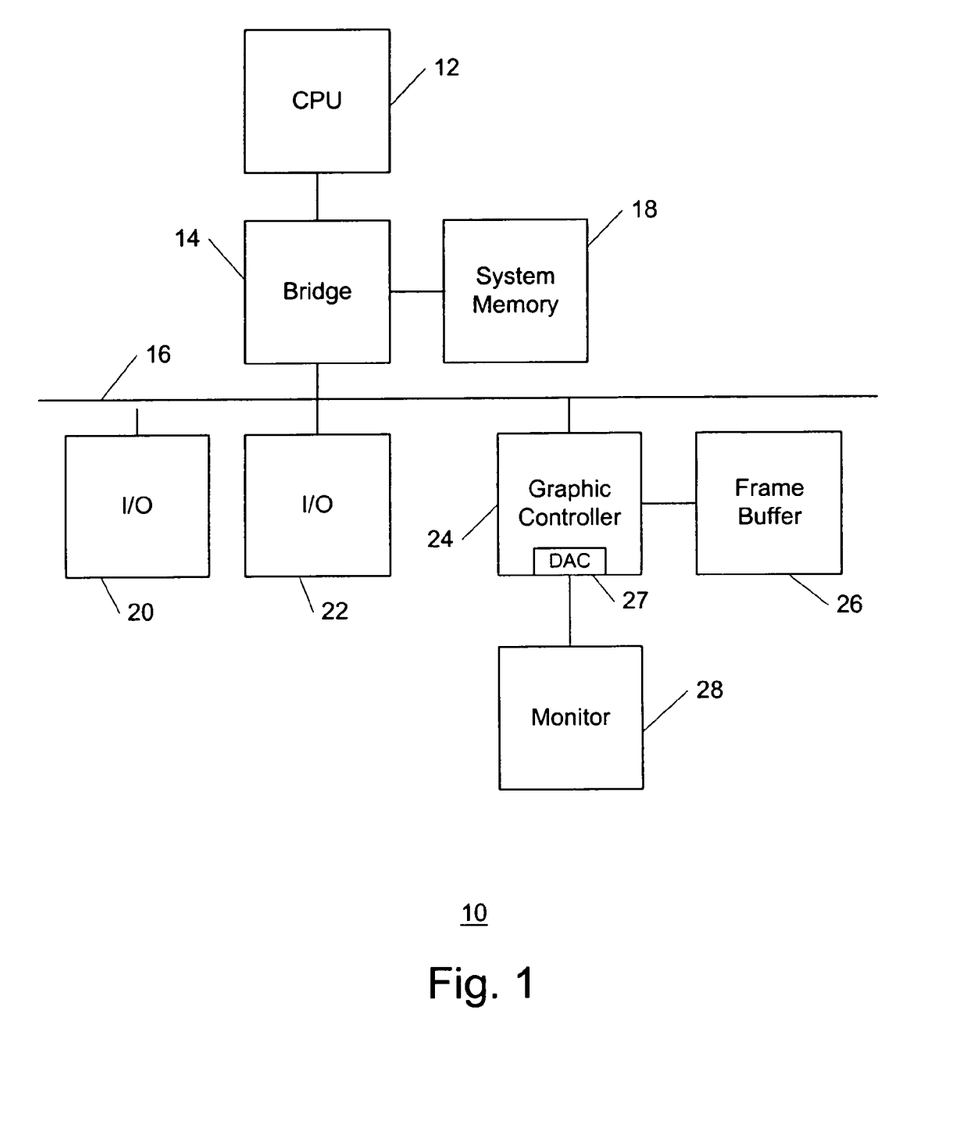
FIG. 1 is a block diagram of a conventional computer system.

FIG. 1 is a block diagram of a conventional computer system. As is seen, the computer system 10 includes a central processing unit (CPU) 12. In this embodiment, the CPU is coupled to a bridge 14. Bridge 14 is coupled to a bus 16 and a system memory 18. The bus 16 in a preferred embodiment is an AGP or PCI bus, which allows for signals to be sent thereon to I/O device 20, I/O device 22, graphics controller 24, and frame buffer 26. As is seen, the graphics controller 24 controls a frame buffer 26 and also sends video information (generally RGB) via a digital analog converter (DAC) 27 to a monitor 28.

It should be understood that the elements of the computer system 10 are shown as discrete components, they can be combined in a variety of fashions and still be within the spirit and scope of the present invention. For example, the bus 16 could be merged into the system, so that there is no actual system bus between the various components but in fact the various components communicate directly. In addition, the graphics controller 24, CPU 12, frame buffer 26, system memory 18 and I/O devices 20 and 22 could be integrated in any fashion and that combination would be within the spirit and scope of the present invention.

The following discussion will describe two conventional techniques for rendering font characters into a memory of the computer system 10. These conventional techniques will be described in the context of pixels being rendered into the frame buffer 26. However, one of ordinary skill in the art readily recognizes that the pixels of information could be rendered into any memory device within the computer system 10. For example the system memory could be utilized in this fashion.

Figure 2:
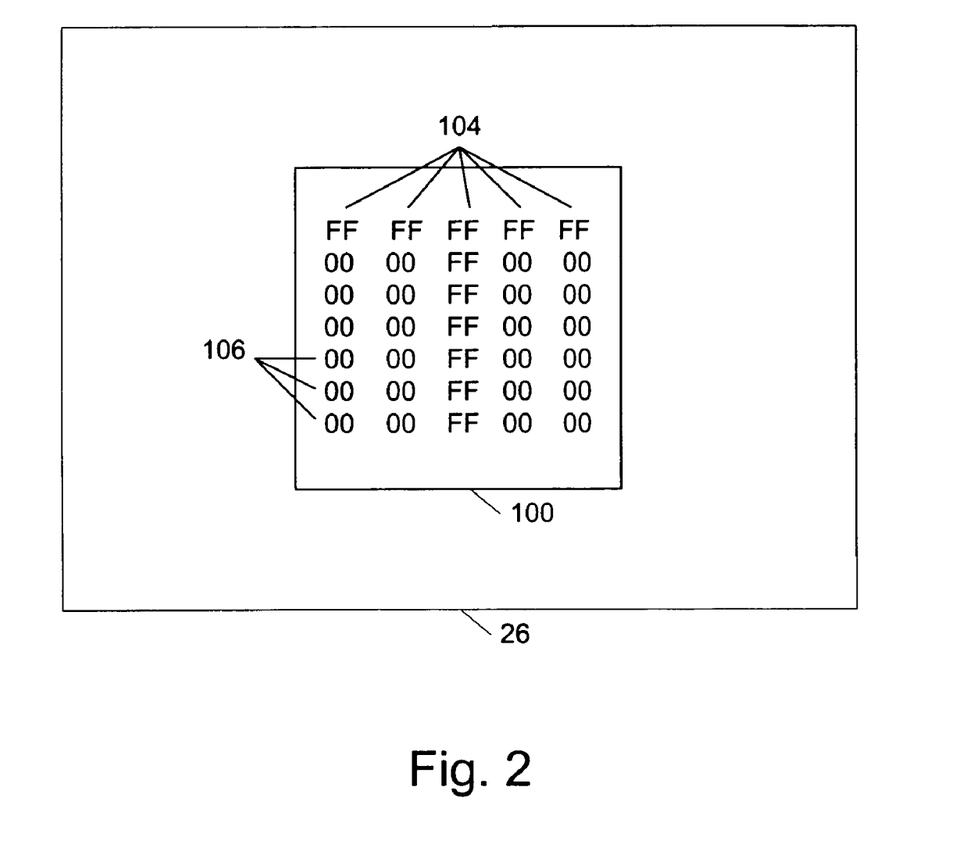
FIG. 2 illustrates rendering of pixels of information into a frame buffer directly by a central processing unit (CPU).

In a first conventional system, the frame buffer 26 receives bytes of information directly from the CPU 12 to render a font characters in the frame buffer 26. FIG. 2 illustrates the rendering pixels of information directly by the CPU 12 to the frame buffer 26. Typically, each of pixel are at least a byte in size, although one of ordinary skill in the art recognizes the pixels could be other sizes such as 16 bits or 32 bits. As is well known, the frame buffer 26 is rendered out typically from left to right. In this embodiment, as seen, the font character 100 is the letter "T". As is also seen in this embodiment if each pixel represents a byte of information, the letter is 5 bytes wide by 7 bytes high. The hexadecimal number 00 106 represents one byte of one color. The hexadecimal number FF 104 represents one byte of another color. Typically, the DAC 27 receives the information and can, for example, convert the 8 bit number to a 24 bit (8 bits each for the red, green and blue channels) value. It should be understood by one of ordinary skill in the art that the color could be represented by any numbers and is not to be limited to the 00 and FF hexadecimal numbers or to one byte per pixel described herein.

As is seen, if it is assumed that each pixel of the font represents a byte of information, then 35 bytes of information are required to represent the particular font character. Therefore, if the frame buffer is an 8 bit frame buffer, the CPU would be required to write 35 bytes directly to the frame buffer to render the font. If the frame buffer is a 16 bit frame buffer, then the CPU would be required to write 70 bytes to render the font. If frame buffer is a 32 bit frame buffer, then it would require 140 bytes for the CPU to render the font. Accordingly, as is seen, as more and larger font character need to be rendered into the frame buffer 26 the processing power and processing time increases significantly.

A second conventional technique rendering characters into a memory reduces processing power and time by providing lossless compression. This is particularly advantageous when rendering font characters into memory because typically fonts are two colors. Therefore, since there are only two colors (for example, black and white), then it is possible to compress the image by having a bit represent a pixel on the frame buffer. It is also possible to provide a transparent mode to further reduce the processing power and time that would require that only one of the colors to be rendered in memory.

Figure 3:
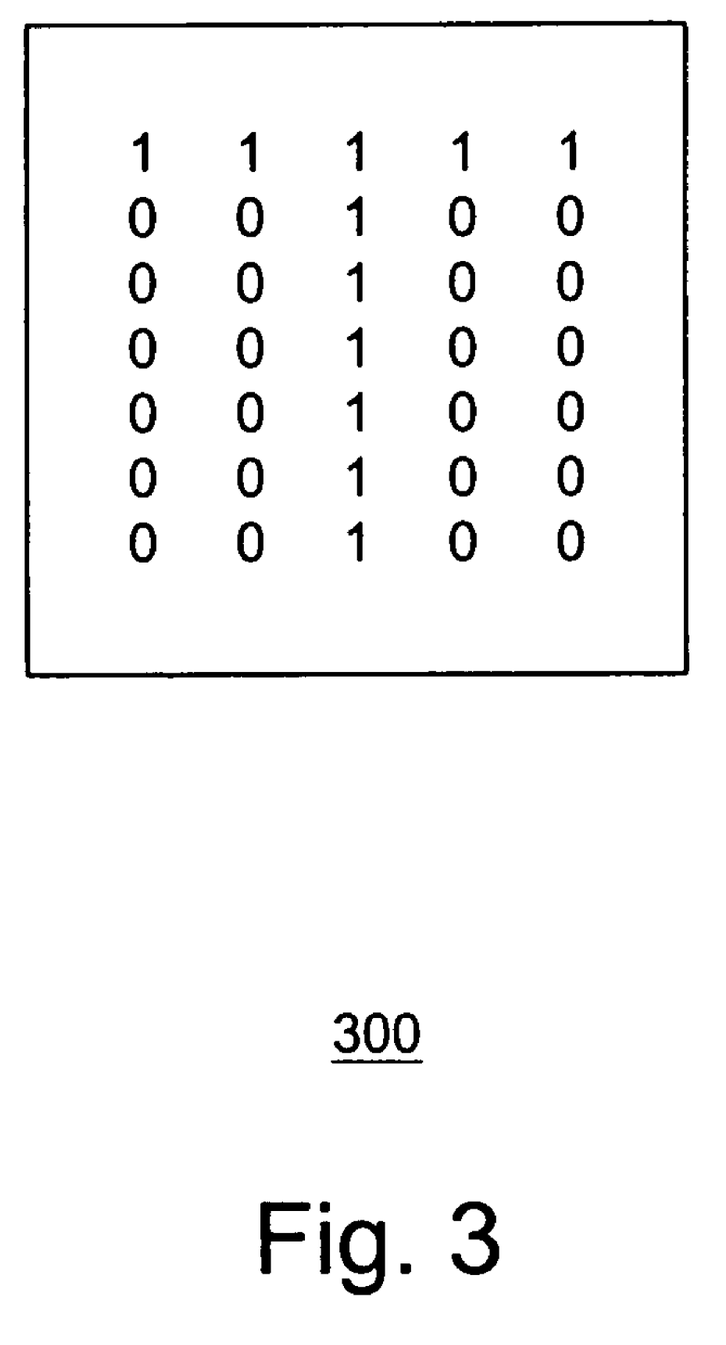
FIG. 3 illustrates a compressed font character produced in accordance with a second conventional technique.

FIG. 3 illustrates a glyph or a compressed font 300 produced in accordance with the second conventional technique. Pixels are represented by a bit of information (i.e., a 1 or a 0). As is seen, each bit 302 represents one of the bytes of the information that was shown previously in FIG. 2. Accordingly, rather than having to provide 35 bytes of information in the case of an 8 bit frame buffer, in this environment the CPU 12 (FIG. 1) would only need to provide 35 bits across the bus 16, which translates into 4⅜ bytes of information. These 4⅜ bytes of information therefore can be decompressed utilizing circuitry in the graphics controller 24.

Figure 4:
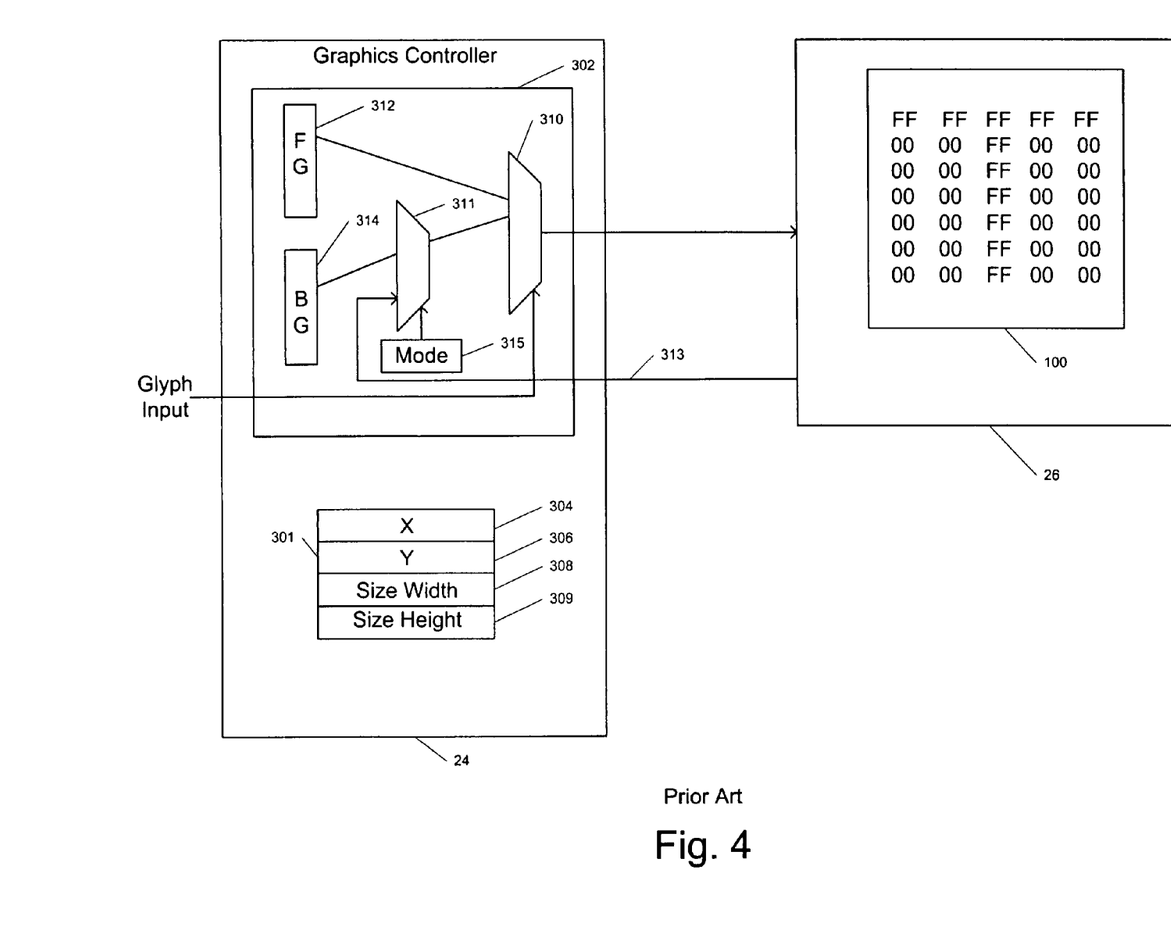
FIG. 4 illustrates a graphics controller and a frame buffer which operates in accordance with the second conventional technique.

FIG. 4 illustrates a graphics controller 24 and a frame buffer 26 in accordance with the second conventional technique. Typically, the graphics controller 24 will include an expansion block 302 which will render the pixel into the frame buffer 26 based upon the glyphs. The expansion block 302 includes first and second registers 312 and 314. A multiplexer 310 within the expansion block 302 is utilized to select between the two registers 312 and 314 based upon the glyph. The selection of the registers 312 and 314 is based upon the bits provided by the CPU 12 (FIG. 1). Accordingly, if the bit provided by the CPU 12 is a foreground color, the multiplexer 310 selects the register 312 which would expand the bit to a plurality of bits (i.e., 8 bits, 16 bits or 32 bits) and those bits are then provided into the frame buffer 26 as a foreground color. On the other hand, if the bit provided is background color, the multiplexer 310 selects register 314 which would expand the bit into a plurality of bits and those bits are then provided to the frame buffer 26 as a background color. As further improvement in the second embodiment, a so-called transparent mode can be provided. In this mode, a multiplexer 311 allows for the background color to be provided from the frame buffer 26 via select line 315 and input 313. For example, if the background color is 00 then the frame buffer automatically loads zeros for the background color of that particular character. In so doing, rendering time is further reduced. Accordingly the character 100 that is rendered in the frame buffer is exactly the same as that shown in FIG. 1.

Through the use of a glyph, it is possible to render information more efficiently than if the CPU 12 is directly writing the information to a memory. Accordingly, for an 8 bit frame buffer there is a 8:1 compression ratio, for a 16 bit frame buffer is a 16:1 ratio or for a 32 bit frame buffer, there is 32:1 compression.

However, the problem with the second conventional technique is that it requires that the CPU 12 input a variety of information that requires several transfers from the CPU 12 to the graphics processor 24. Accordingly, the CPU must first find the font, find the character in the font, and figure out how many bytes to transfer and transfer all the bytes.

To more fully explain this problem, refer now to the following. To reiterate, the graphics controller 24 includes an expansion block 302. The expansion block 302 in a preferred embodiment includes first and second registers 312 and 314. These registers 312 and 314 provide for the foreground and background colors respectively. The foreground and backgrounds are selected by the multiplexer 310 to provide the particular character to the frame buffer 26.

As is seen, a register set 301 is within the graphics controller 24. The register set 301 includes the x-coordinate register 304, a y-coordinate 306, a size width register 308 and a size height register 309 of the font character. In operation, the user of the CPU 12 loads the x and y coordinates registers to provide position information for the font character. The CPU 12 also loads the size height and the size width registers 308 and 309 to provide size information for each font character that is to be rendered into the frame buffer 26. Thereafter each character must be written across the bus to the graphics controller 24. Accordingly, a significant number of transfers are required to ensure that the graphics controller 24 provides the information efficiently to the frame buffer 26. What is desired is to be able to transfer this information more efficiently while still operating in the environment of a conventional computer system.

Accordingly, a system and method in accordance with the present invention provides for a plurality of font arrays to be provided within the memory of a computer system. The memory could be the frame buffer 26, system memory 16 or any other memory within the computer system 10. The graphics controller includes a mechanism which allows for a font array in the memory to be accessed by the graphics controller. The graphics controller also includes a mechanism for allowing each font character to be rendered into the memory. In so doing the number of transfers from the CPU is significantly reduced.

Figure 5:
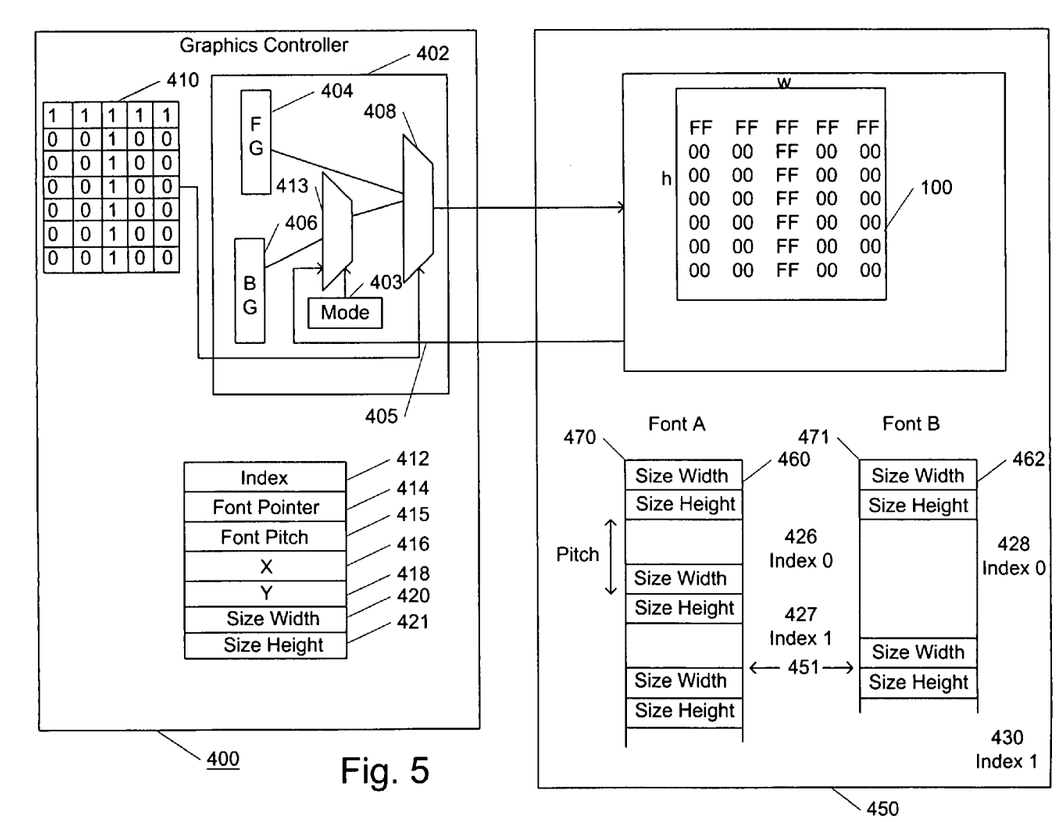
FIG. 5 illustrates a graphics controller and a frame buffer in accordance with the present invention.

To discuss the present invention in the context of a preferred embodiment, refer now to FIG. 5 and the accompanying discussion. FIG. 5 is a block diagram of a graphics controller 400 and a frame buffer 450 in accordance with the present invention. The graphics controller includes an expansion unit 402 that has similar components to that of expansion unit 302 of FIG. 4. The memory 450 includes a data structure 451. The data structure 451 includes a plurality of font arrays 460 and 462. It should be understood that there could be any number of font arrays in the data structure 451. As is seen, in font array 462 the pitch of the font characters is larger than the pitch of the font characters in font array 460. Hence, for each font array 460 and 462 a different index and a different font pointer are required to allow the graphics controller to access the associated font characters. Accordingly, a font pointer is changed when, for example, the font is changed. Each of the font arrays 460 and 462 include information concerning the size of each character and an index that indicates the location of each font character within the font array. The font characters can be either full sized fonts or glyphs. The information within the font array is utilized by the graphics controller 400 to allow the graphics controller 400 to render a particular character retrieved from the memory 450.

The graphics controller 400 includes a plurality of registers to utilize the information related to the font arrays 460 and 462 such that characters can be efficiently retrieved from the frame buffer 450. The various registers and their function are described below.

Index Register 412

This register contains the index to the character in the font array.

Font Pointer Register 414

This register specifies the location of the font array and bytes allocated to each character. The register 414 includes an offset field and a pitch field.

Font Pitch Register 415

This register specifies the number of bytes between the beginning of each character.

X Register 416

This register field contains, for example, the horizontal location of the output monochrome rectangle's upper left corner.

Y Register 418

This register contains, for example, the vertical location of the output monochrome rectangle's upper left corner.

Size Width Register 420

This register contains the width of the output monochrome rectangle. If width is zero, nothing is rendered.

Size Height Register 421

This register contains the height of the output monochrome rectangle. If height is zero, nothing is rendered.

The graphics controller 400 also includes a register 410 that provides the glyph information of a particular character to an expansion block 402 of the graphics controller 400. As is seen, in this embodiment, the particular character that is to be rendered into the memory 450 is the letter "T".

OPERATION

In a preferred embodiment the user loads the font pointer register 414 with a value that points to a font array at an address 470 or to a font array at an address 471 of the memory 450. The user then loads values into the index register 412, x or horizontal information register 416 and y or vertical information register 418. One of ordinary skill in the art recognizes either the x or y registers could also be linear information registers. The graphics controller 400 then looks up the font in the memory 450. The graphics controller 400 then locates the character within the font array by the index from the index register 412. For example, in font array 460 the character 426 would be at index 0. The size width and size height information is part of the character or glyph information. The graphics controller 400 reads that character information from the memory 450 into the register 410 which holds the glyph information. Therefore, the CPU never has to load the width and height information into the registers. This glyph information is then provided to the expansion unit 402. The expansion unit 402 will render the information to the memory portion 450 at the appropriate locations. The x and y coordinates retrieved from registers 416 and 418 would be used to locate within the memory 450 where the particular character was to be written. The size width register 420 provides information concerning the size of the particular character to the memory 450. The size height register 421 provides information concerning the height of the particular character to the memory 450.

Accordingly, in a system and method in accordance with the present invention, the graphics controller performs most of the transfers to the frame buffers and the CPU only needs to transfer minimal data. Therefore, by providing font arrays in the memory and allowing the graphics processor to access those font arrays, the graphics processor can then obtain the font character as a glyph and then render the character on the memory.

In an example, all the user needs is to load the index value, the x value and the y value for the character that is to be rendered, where the index is an ASCII character number. In a preferred embodiment, the x value can be 12 bits, the y value can be 12 bits and the index value can be 8 bits. In so doing, one 32 bit transfer from the CPU to the graphics controller is all that is needed to render the character.

Although the present invention has been described in accordance with the embodiments shown, one of ordinary skill in the art will readily recognize that there could be variations to the embodiments and those variations would be within the spirit and scope of the present invention. For example, one of ordinary skill in the art readily recognizes that the pixels of information could be retrieved from and rendered into any memory device within the computer system. In addition, in the system and method in accordance with the present invention the graphics controller 400 could retrieve characters from a font array that is located in the system memory and render the retrieved characters into the frame buffer 450. Accordingly, many modifications may be made by one of ordinary skill in the art without departing from the spirit and scope of the appended claims.

What is claimed is:

1. A system for rendering a character in a font, the system comprising:
a first memory having stored therein a data structure, the data structure including a plurality of font arrays; and
a graphics controller coupled to the first memory, the graphics controller accessing a font array included in the data structure, the graphics controller comprising a first register for holding glyph information for a character in the font wherein the graphics controller reads the glyph information from the first memory into the first register, a second register that specifies an address for the font array for the font wherein the graphics controller locates the font array using the address, and a third register that contains an index to the character in the font array wherein the graphics controller locates the glyph information for the character in the font array using the index, wherein width and height information for the character is located in the font array using the address and the index in combination, wherein the size of the character is determined according to which of the font arrays is selected, and wherein for the graphics controller to render the character, a central processing unit transfers to the graphics controller only the address for the font array, the index for the character in the font array, an x-value indicating a horizontal position for the character and a y-value indicating a vertical position for the character.

2. The system of claim 1 wherein the first memory comprises a frame buffer.

3. The system of claim 1 wherein the first memory comprises a system memory.

4. The system of claim 1 in which the font array includes a plurality of characters.

5. The system of claim 4 in which each of the characters comprises one bit per pixel.

6. The system of claim 4 in which each of the characters comprises a plurality of bits per pixel.

7. The system of claim 4 in which each of the characters includes size height information.

8. The system of claim 4 in which each of the characters includes size width information.

9. The system of claim 1 in which the graphics controller further comprises a font pitch register.

10. The system of claim 1 in which the graphics controller further comprises an index register.

11. The system of claim 1 in which the graphics controller further comprises a horizontal information register.

12. The system of claim 1 in which the graphics controller further comprises a vertical information register.

13. The system of claim 1 in which the graphics controller further comprises a linear information register.

14. The system of claim 1 in which the graphics controller further comprises a size width register that contains the width of an output monochrome rectangle.

15. The system of claim 1 in which the graphics controller further comprises a size height register that contains the height of an output monochrome rectangle.

16. A method for rendering a character in a font, the method comprising:
accessing, with a graphics controller, a data structure located in a first memory, the data structure including a plurality of font arrays, wherein the font arrays comprise a first font array for characters and a second font array for the characters, wherein the size of the font characters in the first font array is different from the size of the font characters in the second font array;
the graphics controller selecting one of the first and second font arrays using an address specified in a first register of the graphics controller such that the size of a character in the font is determined according to the address specified;
the graphics controller reading information for the character in the font from the selected font array, wherein the character is located by the graphics controller in the selected font array using an index contained in a second register of the graphics controller, and wherein the information includes width and height information for the character; and
the graphics controller placing the information read from the font array in a third register resident on the graphics controller, wherein the third register also holds glyph information for the character, wherein for the graphics controller to render the character, a central processing unit is required to transfer to the graphics controller only the address for selecting one of the first and second font arrays, the index for locating the character in the selected font array, an x-value indicating a horizontal position for the character and a y-value indicating a vertical position for the character.

17. The method of claim 16 wherein the first memory comprises a frame buffer.

18. The method of claim 16 wherein the first memory comprises a system memory.

19. The method of claim 16 in which each of the plurality of font arrays includes a plurality of characters.

20. The method of claim 19 wherein characters within different font arrays can be different sizes.

21. The method of claim 20 in which each of the characters comprises one bit per pixel.

22. The method of claim 20 in which each of the characters comprises a plurality of bits per pixel.

23. The method of claim 16 in which the graphics controller further comprises a font pitch register.

24. The method of claim 16 in which the graphics controller further comprises a horizontal information register.

25. The method of claim 16 in which the graphics controller further comprises a vertical information register.

26. The method of claim 16 in which the graphics controller further comprises a linear information register.

27. The method of claim 16 in which the graphics controller further comprises a size width register that contains the width of an output monochrome rectangle.

28. The method of claim 16 in which the graphics controller further comprises a size height register that contains the height of an output monochrome rectangle.

29. A system for rendering characters, the system comprising:
   a central processing unit;
   a memory coupled to the central processing unit and having stored therein a data structure, the data structure comprising glyph information for each of a plurality of characters, the data structure also comprising size width information and size height information for each of the characters; and
   a graphics controller coupled to said memory;
   wherein the size width information and the size height information for a character to be rendered are read by the graphics controller from the data structure to a register that resides on the graphics controller, wherein the register also contains glyph information for the character read by the graphics controller from the memory, the graphics controller using the glyph information to render the character, wherein for the graphics controller to render the characters the central processing unit is required to transfer to the graphics controller only an address for the data structure, an index value for locating the character in the data structure, an x-value indicating a horizontal position for the character and a y-value indicating a vertical position for the character, wherein the graphics controller locates the data structure using the address and locates the character using the index value.

30. The system of claim 29 wherein the memory comprises a portion of the frame buffer.

31. The system of claim 29 wherein the memory comprises a plurality of data structures, each of the data structures corresponding to a particular character font.

* * * * *